Patented Oct. 24, 1933

1,932,347

UNITED STATES PATENT OFFICE 1,932,347

BETA - ALKYL - AMINO COMPOUNDS OF MONO - HYDROXY - PHENYL - ETHANOLS AND PROCESS OF PRODUCING SAME

Helmut Legerlotz, Berlin, Germany, assignor to Frederick Stearns & Company, Detroit, Mich.

No Drawing. Application March 20, 1928, Serial No. 263,220, and in Germany March 21, 1927

14 Claims. (Cl. 260—128.5)

This invention has reference to the manufacture of ketone-derivatives of the bivalent phenols, and in particular of amino-alcohol derivatives thereof, and it is intended to provide novel and simple means of manufacturing therapeutically valuable bodies of the kind referred to, and it refers likewise to such novel bodies as obtainable by the process of my invention. Aromatic monohydroxy-amino-ketones or their derivatives having substitution groups at the hydroxyl-radical or at the nitrogen-atom have only become accessible by investigations of recent date and laid down in United States application 177,826 now pending, and relating to a process of manufacturing monohydroxy-amino-acetophenons and their nitrogen- or aryl-substitution products. These compounds correspond to the following general formula

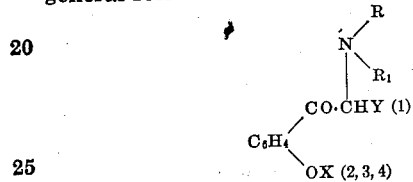

In this general formula X designates hydrogen or a monovalent hydrocarbon-radical or an acyl group; Y indicates hydrogen or a monovalent hydrocarbon-radical, R¹ designates hydrogen or a monovalent hydrocarbon-radical, and R indicates a monovalent hydrocarbon-radical.

The products of reduction obtainable from these substances are distinguished being not poisonous and by possessing valuable therapeutic properties, but their manufacture is difficult, inasmuch as by the ordinary methods of reduction (zinc and acid, aluminium-amalgam and similar methods) they cannot be obtained in commercially satisfactory quantities, or they fail to be produced altogether. This is a rather surprising fact, the more so, since corresponding compounds which, however, do not contain hydroxyl-groups at the nucleus, may be readily obtained with very satisfactory yields by operating in the manner referred to.

Now, I have ascertained in the course of my experiments that the said amino-alcohols or ethanols may be readily obtained, and mostly with very good yields by submitting amino-ketones to the action of elementary hydrogen in the presence of colloidal or finely subdivided metals of the platinum group. In further pursuance of my invention it has been found that the yield is also governed by the nature of the solvent and the quantity of the said catalyst of the platinum group. Thus, while, for instance the reduction of the para-hydroxy-methylamino-acetophenone

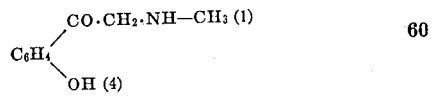

in aqueous solution can be very easily accomplished with the formation of the corresponding amino-alcohol, this substance, when glacial acetic acid is employed as a solvent, but with other conditions unchanged, is at best only formed in traces. On the other hand, generally speaking, the yield of amino-alcohol has been found to be in the inverse ratio of the amount of the catalyst employed, so that with an increase of the catalyst the yield decreases. This is a somewhat unexpected and surprising result which could not be inferred from the state of the previous art. As an instance of carrying out this feature of my invention I have found that high yields of about 90% will be obtained with a proportion of about one gram palladium-chloride, converted into the metal, to about 100 grams of the mono-hydroxy-amino-acetophenon to be treated.

*Example 1.*—5 grams para-hydroxy-methyl-amino-acetophenon-hydrochloride

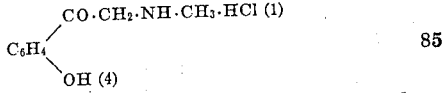

are dissolved in a small amount of water, and to the solution is added 0.2 gram of finely subdivided palladium preferably precipitated upon carbon as a carrier, and the mixture is treated with elementary hydrogen according to Paal, preferably in the apparatus suggested by him, and described in Berichte der Deutschen Chemischen Gesellschaft, vol. 37,124 (1904), vol. 38 pge. 1398 (1905) and vol. 44, page 2864 (1911), until 2 atoms of hydrogen have been taken up. After the reduction is terminated, an excess of ammonia is added to the filtrate, whereupon after some time the para-hydroxyphenyl-ethanol-methyl-amine

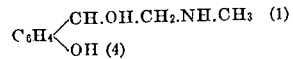

is formed as a fine white meal of crystals, having a melting point of 184–185° C. The hydrochloride of the base melts at 155–156° C.

*Example 2.*—4.5 grams of the hydrochloride of meta-hydroxy-methyl-amino-acetophenone are dissolved in a small amount of water; to the solution a solution of colloidal palladium obtained from 0.25 palladium-chloride in the usual manner is added, and the mixture is treated with hydrogen in the manner above described. After diluting the reaction liquid with acetone it is filtered, and the residue obtained after the evaporation of the filtrate in vacuo, and complete drying over pentoxide of phosphorus is then dissolved in absolute alcohol, and to this is added about the same volume of dry ether, until turbidity just commences to occur. After a short time the hydrochloride of the meta-hydroxy-phenyl-ethanol-methylamine

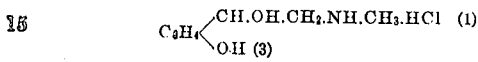

will separate out as a colorless mass of crystals of a melting point 142–143° C.

*Example 3.*—100 grams para-hydroxy-methyl-amin-acetophenone-hydrochloride are shaken with hydrogen in a concentrated aqueous solution, and with about 12 grams of bone-black upon which has been precipitated the metal from one gram palladium-chloride. After the absorption of hydrogen has been terminated, the aqueous solution is sucked off, and is treated with an excess of ammonia. The base which is collected after 24-hours' standing, melts at 184–185° C. The yield is about 73 grams, that is to say of 90 percent of the theoretical yield. By proceeding according to Example 3 with the difference, however, that about 4 to 5 times as much of the catalyst is employed, only about 60 percent of the theoretical yield of the amino-alcohol are obtained.

The process according to my invention is applicable broadly to all compounds of the kind referred to and possessing an alkoxy or acyloxy group or a hydroxyl-group linked to the benzene-nucleus and to all such compounds in which the amino-radical is monosubstituted or di-substituted by monovalent hydrocarbon radicals, and it is susceptible of other changes and modifications which are obvious to the experimenter, except as otherwise appears from the wording of the appended claims.

I claim:—

1. The process of manufacturing amino compounds of mono-hydroxy-phenyl-ethanols which consists in treating a concentrated solution of a mono-hydroxy-phenyl-beta-(alkyl-amino)-methyl-ketone with hydrogen in presence of a catalyst of the platinum group, separating the reaction product from the catalyst and evaporating the solvent.

2. The process of manufacturing amino compounds of mono-hydroxy-phenyl-ethanols which consists in treating a concentrated solution of a salt of a mono-hydroxy-phenyl-beta-(alkyl-amino)-methyl-ketone with hydrogen in presence of a catalyst of the platinum group, separating the reaction product from the catalyst and evaporating the solvent.

3. The process of manufacturing amino compounds of mono-hydroxy-phenyl-ethanols which consists in treating a concentrated solution of a hydrochloride of a mono-hydroxy-phenyl-beta-(alkylamino)-methyl-ketone with hydrogen in presence of a catalyst of the platinum group, separating the reaction product from the catalyst and evaporating the solvent.

4. The process of manufacturing amino compounds of mono-hydroxy-phenyl-ethanols which consists in treating a concentrated solution of a salt of a mono-hydroxy-phenyl-beta-(alkyl-amino), methyl-ketone with hydrogen in presence of a catalyst of the platinum group, separating the reaction product from the catalyst, treating the solution obtained with ammonia and separating the precipitated product from the liquid.

5. The process of manufacturing methyl-amino compounds of mono-hydroxy-phenyl-ethanols which consists in treating a concentrated solution of a mono-hydroxy-phenyl-beta-(methyl-amino)-methyl-ketone with hydrogen in presence of a catalyst of the platinum group, separating the reaction product from the catalyst and evaporating the solvent.

6. The process of manufacturing methyl-amino compounds of mono-hydroxy-phenyl-ethanols which consists in treating a concentrated solution of a salt of a mono-hydroxy-phenyl-beta-(methyl-amino)-methyl-ketone with hydrogen in presence of a catalyst of the platinum group, separating the reaction product from the catalyst and evaporating the solvent.

7. The process of manufacturing methyl-amino compounds of mono-hydroxy-phenyl-ethanols which consists in treating a concentrated solution of a hydro-chloride of a mono-hydroxy-phenyl-beta-(methyl-amino)-methyl-ketone with hydrogen in presence of a catalyst of the platinum group, separating the reaction product from the catalyst and evaporating the solvent.

8. The process of manufacturing methyl-amino compounds of mono-hydroxy-phenyl-ethanols which consists in treating a concentrated solution of a salt of a mono-hydroxy-phenyl-beta-(methyl-amino)-methyl-ketone with hydrogen in presence of a catalyst of the platinum group, separating the reaction product from the catalyst, treating the solution obtained with ammonia and separating the precipitated product from the liquid.

9. Beta-alkyl amino compounds of mono-hydroxy-phenyl-ethanols being colorless crystals and having adrenaline-like therapeutic properties.

10. Beta methyl-amino compounds of mono-hydroxy-phenyl-ethanols being colorless crystals and having adrenaline-like therapeutic properties.

11. The hydrochloric-acid salts of mono-hydroxy-phenyl-beta-(alkyl-amino)-ethanols constituting substantially colorless crystals, soluble in water.

12. Meta-mono-hydroxy-phenyl-methyl-amino-ethanol of the formula

13. The hydrochloride of meta-mono-hydroxy-phenyl-methyl-amino-ethanol corresponding to the formula

having a melting point of about 142 to 143 degrees C.

14. Para-mono-hydroxy-phenyl-methyl-amino-ethanol of the formula

HELMUT LEGERLOTZ.